Figure 1:
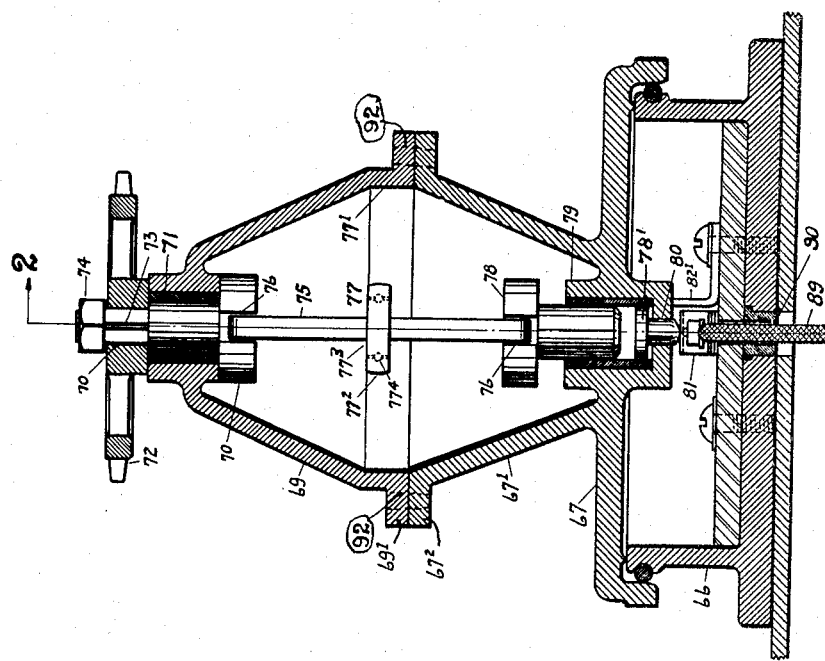

A. J. BROOKINS.
GOVERNOR TO CONTROL ELECTRIC TERMINALS.
APPLICATION FILED DEC. 9, 1918.

1,328,490.

Patented Jan. 20, 1920.
2 SHEETS—SHEET 1.

INVENTOR
Andrew J. Brookins,
BY
Charles Turner Brown,
ATTORNEY.

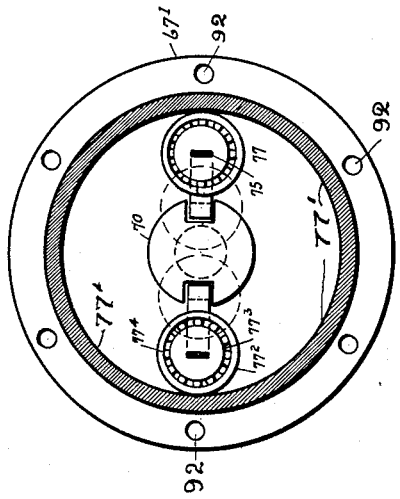
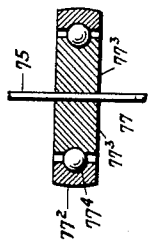
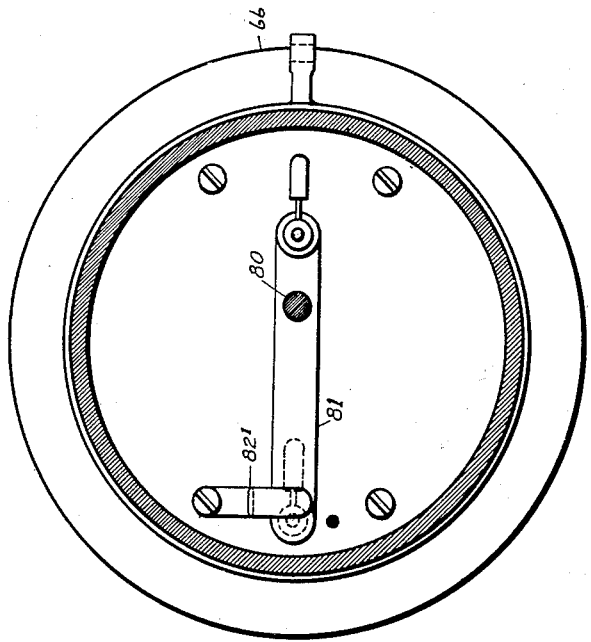

UNITED STATES PATENT OFFICE.

ANDREW J. BROOKINS, OF CHICAGO, ILLINOIS.

GOVERNOR TO CONTROL ELECTRIC TERMINALS.

1,328,490.      Specification of Letters Patent.      Patented Jan. 20, 1920.

Application filed December 9, 1918. Serial No. 265,868.

*To all whom it may concern:*

Be it known that I, ANDREW J. BROOKINS, a citizen of the United States, and a resident of Chicago, in the county of Cook and State of Illinois, have invented certain new and useful Improvements in Governors to Control Electric Terminals, of which the following, when taken in connection with the drawings accompanying and forming a part hereof, is a full and complete description.

This invention relates to governors designed to automatically control the making and breaking of an electric circuit when a pre-determined speed of the driven shaft thereof is attained.

The objects of the invention include the making of a governor which may be driven by a chain running over sprocket wheels and may be installed in places which are difficult of access for purposes of inspection, with the certainty that in case of inoperativeness, either by reason of the breaking of the chain or from other causes, notice thereof will be automatically given. Said objects also include the production of a governor of the kind named which may be installed in places where it is subjected to mud, dust, water and the like, without injury being caused thereto; the production of a governor comprising few parts, which can be economically made, is not liable to break or get out of order; and which may be driven at any desired over-speed.

Additional objects are disclosed by this specification and the claims appended hereto.

I have illustrated a governor embodying the invention in the drawings wherein,—

Figure 2:
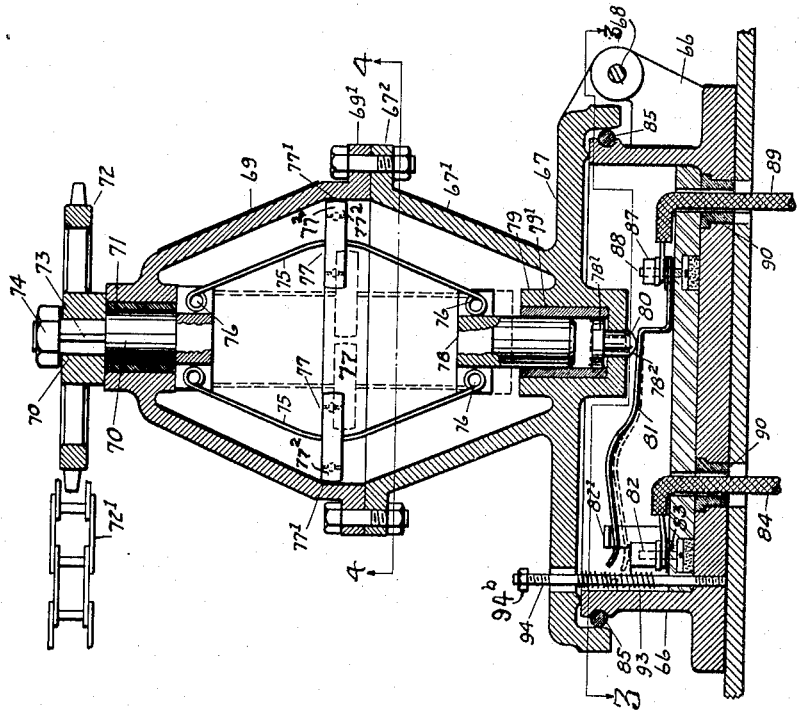

Figure 1 is a vertical section, with the movable parts in an operated position;

Fig. 2 a vertical section on line 2—2 of Fig. 1, viewed in the direction indicated by the arrows; with the movable parts indicated by broken lines in an inoperated position.

Fig. 3 a lateral section, on line 3—3 of Fig. 1, viewed in the direction indicated by the arrows;

Fig. 4 a lateral section on line 4—4 of Fig. 1, also viewed in the direction indicated by the arrows, and Fig. 5 a sectional view of a ball member of the device.

A reference character applied to designate a given part indicates said part throughout the several figures of the drawings, wherever the same appears.

66 represents the base shell of the device; 67 the cover to shell 66, said cover being attached to said shell by pintle 68; and $67^1$ a flaring wall which is shown as integral with said cover 67. Flaring wall $67^1$ is provided, at the larger end thereof with the annular flange $67^2$. 69 represents a flaring wall which is the complement of wall $67^1$, and is provided with annular flange $69^1$ fitting to flange $67^2$. Walls $67^1$ and 69 are attachable together by bolts extending through apertures 92. 70 represents a shaft which is rotatably mounted in journal bearing 71, positioned at the smaller end of flaring wall 69. 72 represents a sprocket wheel mounted on shaft 70, being illustrated as joined thereto by key 73, to turn therewith, and held in place by nut 74; and $72^1$ represents a portion of a sprocket chain by means of which said sprocket wheel 72 is drivable.

75 represent resilient members which are illustrated as pivotally attached, at one end thereof, by pins 76, to shaft 70, and at the other end thereof, by like pins 76, to the rotatably mounted shaft 78, in bearing 79 on cover 67. 77, 77, represent the governor weights which are mounted on resilient members 75, 75, and which tend on the rotation of shafts 70, 78 and the turning of said resilient members therewith, to force said resilient members from the position indicated by broken lines in Fig. 2, into the position illustrated in Figs. 1 and 2 by full lines.

On the inner face of the wall of the chamber which is obtained by the flaring walls $67^1$ and 69 I provide the track or runway $77^1$, and I construct the ball members 77 in substantially the same way as what are known as ball bearings are constructed, so that when the resilient members are in the position illustrated in Fig. 2, (on the attaining of the pre-determined speed in the rotation of shafts 70, 78), the outer member ($77^2$) of said ball members travel thereon; thereby relieving members 75 from further strain, due to centrifugal force, from an increased speed in said rotation. The inner members ($77^3$) of ball members 77 are firmly secured to resilient members 75, and the balls $77^4$ are interposed between said members $77^2$ and $77^3$ to obviate any appreciable twisting strain on said resilient members in the operation of the governor.

The shaft 78 is axially as well as rotatably movable in its bearing. $78^1$ represents a loosely mounted disk having abutment 78²; 79¹ Babbitt metal, and 80 insulation which is pressed against and forces the free end of spring conductor 81 on to terminal 82 and in electric contact therewith, when said shaft and resilient members 75 are in the position which is illustrated in Fig. 1, and which is retracted from said spring conductor, permitting it to break contact with said terminal when in the position which is illustrated in Fig. 2.

Terminal 82 comprises the screw threaded bolt or post 83, to which one end of the electrical conductor 84 is attached. 82¹ represents an electrical terminal which is in spaced relation to terminal 82. 85 represents packing material between the cover 67 and the base shell 66. 86 represents insulating material.

The rigidly held end of conductor 81 is mounted on terminal 87, which comprises the screw threaded post 88; and the conductor 89 is electrically attached thereto. 90, 90, respectively represent a sleeve made of insulating material, through which the conductors 84 and 89 respectively extend. 91 represents a base or plate to which the governor is attached.

The movable or free end of conductor 81 is held in electrical contact with the terminal 82 when members 75 are not sufficiently acted upon by ball members 77, (through centrifugal force), to retract shaft 78; said members 75 then being in substantially the position which is indicated by the broken lines in Fig. 2. When shafts 70 and 78, with members 75 and ball members 77 are rotating at, (and faster than) the pre-determined speed, the outer member, (77²) of said ball members travels on track 77¹, and shaft 78 is retracted from disk 78¹. As disk 78¹ ceases to be held in an advanced position by shaft 78, conductor 81, by its own resiliency in the one which illustrated in the drawings, forces said disk back, and the free end of said conductor makes electrical contact with terminal 82¹, as is illustrated in the drawings, Figs. 1 and 2. As the speed of shaft 70, members 75 and shaft 78, when the device is being operated, is usually sufficient to cause ball members 77 to travel on track 77¹, the conductor 81 is said to be normally in contact with terminal 82¹ and the electrical circuit of which conductors 84 and 89 are elements is normally broken when said conductors are attached to terminals 82 and 87, as illustrated. By transferring conductor 84 to terminal 82¹ said circuit would be normally closed.

93 represents a spring, 94 a bolt and 94ᵇ an adjustable nut on said bolt. Spring 93 tends to force cover 67 to turn on pintle 68, and automatically compensate for a limited stretching of sprocket chain 72¹. Nut 94ᵇ permits sufficient opening of said cover to break the contact of conductor 81 with terminal 82, in case chain 72¹ becomes inoperative, by being too long, jumping sprockets, or breaking.

The operation of the device is as follows:—

As long as the driven shaft thereof (70) is at rest or rotating below a determined rate of speed the springs 75 hold member 80 against contact arm or movable conductor 81 to force the movable end thereof into electrical contact with terminal 82. As soon as the rotation of shaft 70 attains the pre-determined rate of speed the balls 77 are forced outward from the axial line of the shafts of the device, by centrifugal force overcoming the resiliency of springs 75, thereby producing axial movement of shaft 78 in its journal bearing and retracting said shaft. Conductor 81 will force disk 78¹ back, to follow up the movement of shaft 78, and the free end of said conductor will become disengaged from terminal 82 and engage terminal 82¹. The conductors 84 and 89 being attached to terminals 82 and 87, (or 82¹ and 87, as preferred) and interposed to form elements of an electric circuit, the continuity of said circuit will be controlled by the recited action of the device and said circuit will be broken, (or established), thereby.

On the outward movement of the balls 77 the members 77² thereof will travel on track or runway 77¹, and additional speed of rotation of the shafts of the device will entail no additional strain on the resilient members 75.

It will be observed that the hereinbefore described construction and operation provides for the same result relative to the making or breaking of an electric circuit, when the driving means are inoperative as when the shafts are driven at a predetermined speed; as spring 93 will open cover 67 sufficiently to permit movable conductor 81 to break electrical contact with terminal 82 upon the chain 72² becoming "stretched," broken, or coming off of its sprocket wheels.

I claim:—

1. In a governor, an axially movable and rotatably mounted member, ball members, and means connected thereto to convert the movement of said ball members, by centrifugal force, to axial movement of said rotatably mounted member, said ball members comprising a plurality of elements in spaced relation and balls interposed between said elements, in combination with a track positioned in the path of movement of one of said plurality of elements to limit upon a pre-determined movement thereof by centrifugal force the outward travel, of said ball members.

2. In a governor, a two-part case, a shaft rotatably mounted in one of said parts and a wheel on said shaft, in combination with means to drive said wheel, said means and case in spaced relation so that said means maintains the parts of said case in a pre-determined relative position.

3. In a governor, a two part case, means to yieldingly force said parts to separate, a shaft rotatably mounted in one of said parts and a sprocket wheel on said shaft, in combination with a sprocket chain to said wheel, said chain and case in spaced relation so that said chain maintains the parts of said case in a pre-determined relative position against said means to force said parts to separate.

4. In a governor, a two-part case, means to maintain said parts in close relation, a shaft and an axially movable member journaled in one of said parts, ball members and means whereby the movement of said ball members resulting from centrifugal force moves said axially movable member to retract it from its normal position, in combination with electric terminals and an electric conductor mounted in the other of said parts, said axially movable member, conductor and parts of said case in spaced relation to maintain said conductor in electrical contact with a predetermined one of said terminals when said parts are in close relation and said axially movable member is in its normal position.

5. In a governor, a two part case, means to yieldingly force said parts to separate, means to maintain said parts in close relation against said means to force said parts to separate, a shaft and an axially movable member journaled in one of said parts and ball members and means whereby these members act to move said axially movable member and retract it from its normal position, in combination with electric terminals and an electric conductor mounted in the other of said parts, said axially movable member, conductor and parts of said case in spaced relation to maintain said conductor in electrical contact with a pre-determined one of said terminals when said parts are in close relation and said axially movable member is in its normal position.

6. In a governor, a two part case, a shaft rotatably mounted in one of said parts and a wheel on said shaft and means to drive said shaft, said driving means and case in spaced relation so that said driving means maintains said parts in a pre-determined relative position, in combination with a movable conductor adapted to be forced into electrical contact with an electric terminal and normally not in said contact, and means in the part of said case in which said shaft is mounted to force said conductor into said electrical contact with said terminal when said forcing means are in normal position and said parts of said case are in said pre-determined relative position.

ANDREW J. BROOKINS.

In the presence of—
E. A. WINCHELL,
CHARLES TURNER BROWN.